United States Patent [19]

Jordens et al.

[11] Patent Number: 4,805,884
[45] Date of Patent: Feb. 21, 1989

[54] FLUID CUSHIONING MOUNTING PARTICULARLY FOR ENGINES IN MOTOR VEHICLES

[75] Inventors: Ernst-Günter Jordens, Damme; Johannes Sprute, Osnabrück, both of Fed. Rep. of Germany

[73] Assignee: Lemförder Metallwaren A.G., Fed. Rep. of Germany

[21] Appl. No.: 40,316

[22] Filed: Apr. 20, 1987

[30] Foreign Application Priority Data

Apr. 26, 1986 [DE] Fed. Rep. of Germany ....... 3614162

[51] Int. Cl.$^4$ .................. F16F 13/00; B60K 5/12
[52] U.S. Cl. .................. 267/140.1; 248/562; 248/636
[58] Field of Search .............. 188/320; 267/140.1, 267/140.2, 35; 248/636, 652, 562, 563, 566

[56] References Cited

U.S. PATENT DOCUMENTS 3,266,603  8/1966  Kamimoto ............ 188/322.16
4,681,306  7/1987  Hofmann ............. 267/140.1

FOREIGN PATENT DOCUMENTS 2906282  8/1980  Fed. Rep. of Germany ...... 248/562
3410781  3/1985  Fed. Rep. of Germany ... 267/140.1

Primary Examiner—Andres Kashnikow
Assistant Examiner—Mark T. Le
Attorney, Agent, or Firm—McGlew and Tuttle

[57] ABSTRACT

A dual-chamber support bed with hydraulic cushioning especially for engine mount in motor vehicles includes a working chamber and a compensating chamber filled with liquid have walls (3, 4) comprising annular rubber diaphragms with a predetermined buckling characteristic to adapt to the operating load the chambers are connected to one another through a nozzle channel. The nozzle channel is defined between profiled parts overlapping one another which are two rigid components of a housing that are adjustable to one another. The channel flow resistance is adjustable by means of a screw-driven regulating unit. The two components forming the nozzle channel there between are adjustable axially relative to one another in the direction of the vertical axis of the mount. One of these components is thread onto a spindle that can rotate freely in the housing. An operating member for rotating the spindle extends out of the housing, and can be screwed on it coaxially with the vertical axis.

5 Claims, 2 Drawing Sheets

4,805,884

FLUID CUSHIONING MOUNTING PARTICULARLY FOR ENGINES IN MOTOR VEHICLES

BACKGROUND OF THE INVENTION

1. Field of the Invention

This invention relates in general to resilient mounting devices and in particular to a new and useful fluid cushioned mounting particularly for engines in motor vehicles.

Engine mounts with these features are disclosed by German Patent Application Disclosure No. 34 10 781. It has a nozzle channel in a rigid partition that separates the upper working chamber from the compensating chamber located below it. The cushioning characteristics of the mount can be adjusted. The nozzle channel is formed by disc recesses which open toward one another. The discs can rotate around a vertical axis of the mount and be brought into positions aligned for individual cushioning during the installation of the mount. Since the base of the recesses open toward one another has the design of an inclined plane, both the length and the cross section of the nozzle channel can be changed by rotating the disks. However, this change can be made only during the installation of the mount, or after partial disassembly of the mount. After installing the mount, no further adjustment is possible. The behavior of the mount desired over the required frequency range is adjustable by the means mentioned, however, so that individual tolerances and inaccuracies can be adjusted by changing the length and the cross section of the nozzle channel to an acceptable initial value. Nozzle channels between the two chambers of an engine mount are also known with flow rates continuously adjustable electronically to control the cushioning characteristics of the engine mount. However, the necessary technical expense exceeds by far the costs of a mount pursuant to German Patent Application Disclosure No. 34 10 781.

SUMMARY OF THE INVENTION

The invention provides an adjustment capability of dual-chamber support beds for the cushioning characteristics of the mount even after its installation, and provides primarily a permanent adjustment capability of the cushioning behavior.

An outstanding advantage is the fact that the invention makes it possible to control the cushioning characteristics even after the installation of the mount, so that a continuous adaptation of the cushioning characteristics to changing operating sates can be carried out by constant adjustment. For this purpose, sensors in the vehicle can optionally transmit the operating state to the control element for the cushioning characteristics in the mount by means of regulating units. Manual adaptation to a desired behavior is also possible at any subsequent time in this way.

In a preferred form of embodiment, the compensating chamber extends annularly round a central working chamber with the means for controlling the cushioning characteristics being located in components of a housing freely accessible from the outside. With such a design, the nozzle channel is placed in an annular component that also serves as a supporting element for the annular rubber diaphragm of the wall of the working chamber and is connected securely to a flat base section. In this way, the base section is readily accessible from the outside and is thus suitable for holding adjustable elements to control the cushioning characteristics of the support bed. In a dual-chamber support bed with a nozzle channel concentric with the vertical axis of the mount in a plane across it, the invention provides for one of the two components forming the nozzle channel to engage with a raised profile in a corresponding die profile of the other component and to be adjustable in this profile by means of the spindle. Since this spindle has the operating element coming out of the housing to the outside, a change of cross section of the nozzle channel can be carried out during the entire driving operation of the motor vehicle by simply turning the spindle. This advantage makes it possible to control the cushioning characteristics manually or automatically.

According to another embodiment of the invention, it is provided that the die profile forming the nozzle channel, which is connected through openings to the working chamber and to the compensating chamber, is sealed by an elastic diaphragm and the raised profile of the first component is adjustable relative to this diaphragm. The length of the nozzle channel is also directly variable by this diaphragm, since the component coaxially adjustable by this seal can also be rotated relative to the first component. Both an axial adjustment and a rotation of the adjustable component can be achieved by automatic stop elements or stop elements that can be operated from the outside.

Accordingly, it is an object of the invention to provide a fluid cushion mounting particularly for engines in motor vehicles which includes a base which is covered on its top by a resilient member which has based upon resilient walls defining a compensating chamber there between which communicates with a working chamber through a nozzle channel and which includes means for varying the flow through the nozzle channel.

A further object of the invention is to provide a resilient mounting which may be continuously adjusted so as to regulate the compensating force of a fluid support having an upper part which is connectable to the motor to be supported and a base which is simple in design rugged in construction and economical to manufacture.

GENERAL DESCRIPTION OF THE PREFERRED EMBODIMENTS

Figure 1:
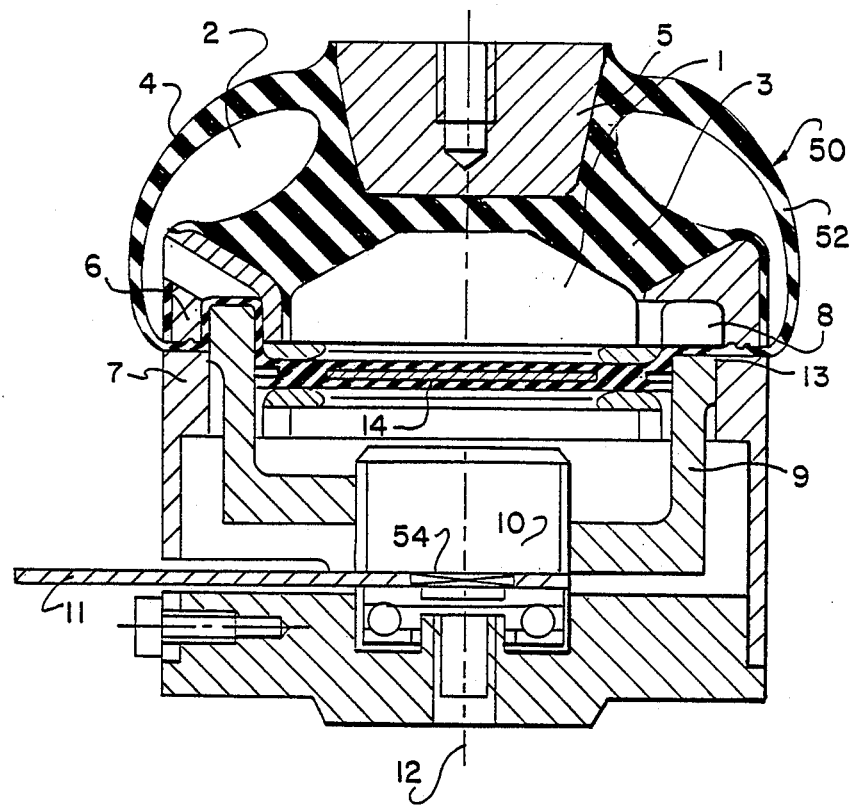
FIG. 1 is a vertical sectional view of an engine support mount.

Referring to the drawings in particular, the invention embodied therein comprises a fluid cushion mounting generally designated 50 which includes a base portion 7 having upstanding walls with a top opening which is covered by a resilient member 52 which has spaced apart walls 3 and 4 and a bottom recess which overlies the base member and defines a working chamber 1 which communicates with a compensating chamber 2 through a nozzle channel 3 which is defined between the base and the resilient member 52. In accordance with the invention means are provided for varying the flow through the nozzle channel 8 in accordance with operating conditions and in the embodiment of FIG. 1.

this comprises a second component member 9 which is movable in the base part 7 into an out of recess defining the nozzle channel 8 so as to vary the flow cross-section of the nozzle channel 8.

The embodiment of FIG. 1 shows a dual-chamber support or engine mount 50 with hydraulic cushioning, especially for an engine mount in motor vehicles. The mount 50 includes a working chamber 1 and compensating chamber 2 filled with liquid which have respective walls 3 and 4 made of annular rubber diaphragms. The compensating chamber 2 extends annularly around a central working chamber 1, so that the rubber housing 52 forming the walls 3 and 4 have a one-piece interconverted design. Rubber housing 52 is connected securely to the upper, centrally located support element 5, that can be fastened to the engine or to another supporting part. The free end of the rubber housing 52 forming the wall 3 of the working chamber 1 is connected securely to a component or ring 6, that can be screwed to an annular base or housing 7 of the working chamber.

A nozzle chamber 8 in the example of embodiment according to FIG. 1 is formed from a matrix-shaped recess in the ring 6 and from a raised profile of a second ring or second component 9, whose raised profile engages in the matrix-shaped recess of the first ring 6. This second component 9 is cup-shaped in vertical section, so that the edge is the same as or similar to the matrix-shaped design of the channel 8. The second component 9 with a female thread is screwed to a centrally located spindle 10 that is mounted to rotate freely in the housing 7 and can be rotated by means of an operating element 11 extending laterally out of the housing. By rotating the spindle 10 around the vertical axis 12 of the mount, an axial displacement of the second component 9 is produced. The matrix profile in the first component 6 is sealed by means of an elastic diaphragm or ring 13, so that edge of the second component 9 works against this membrane 13 with its raised profile. This diaphragm 13 is clamped in between the first component 6 and the base section of the housing 7 and advantageously has a one-piece construction along with an additional buckling spring 14 that represents another control element for changing the buckling characteristics of the rubber diaphragm walls 3 and 4. The operating element 11 in the case of the example has the form of a lever extending laterally out of the housing 7 that is movable in a slot of the housing. To produce multiple spindle rotation by moving the lever 11 in a limited slot, a ratchet connection 54 is provided between the lever 11 and the spindle 10. It is clear from the drawing that both a rotation of the second component 9 and an axial displacement of this component can be produced by rotating the spindle 10, on the one hand to change the length of the nozzle channel 8 and on the other hand to change its cross section.

Figure 2:
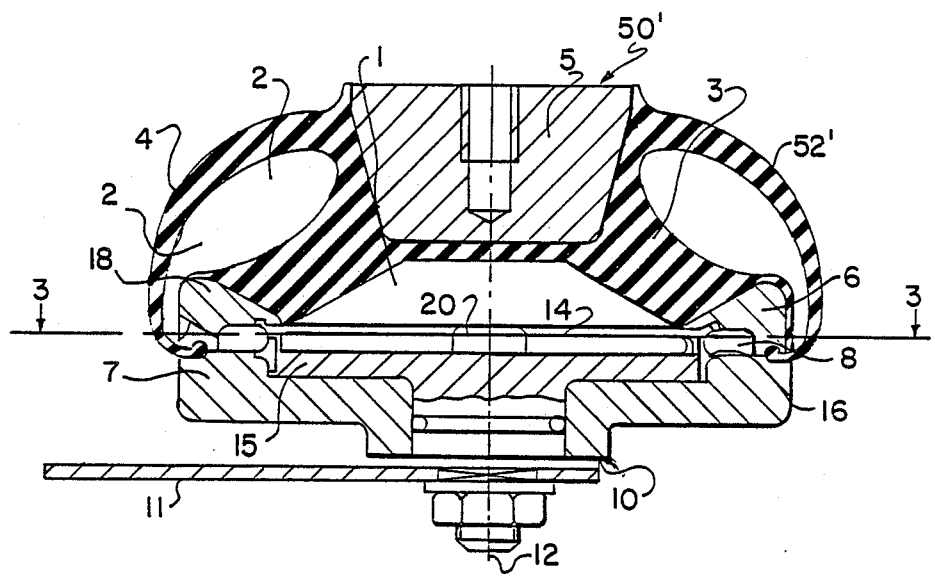
FIG. 2 is a vertical sectional view of an engine support mount constructed in accordance with another embodiment of the invention.
Figure 3:
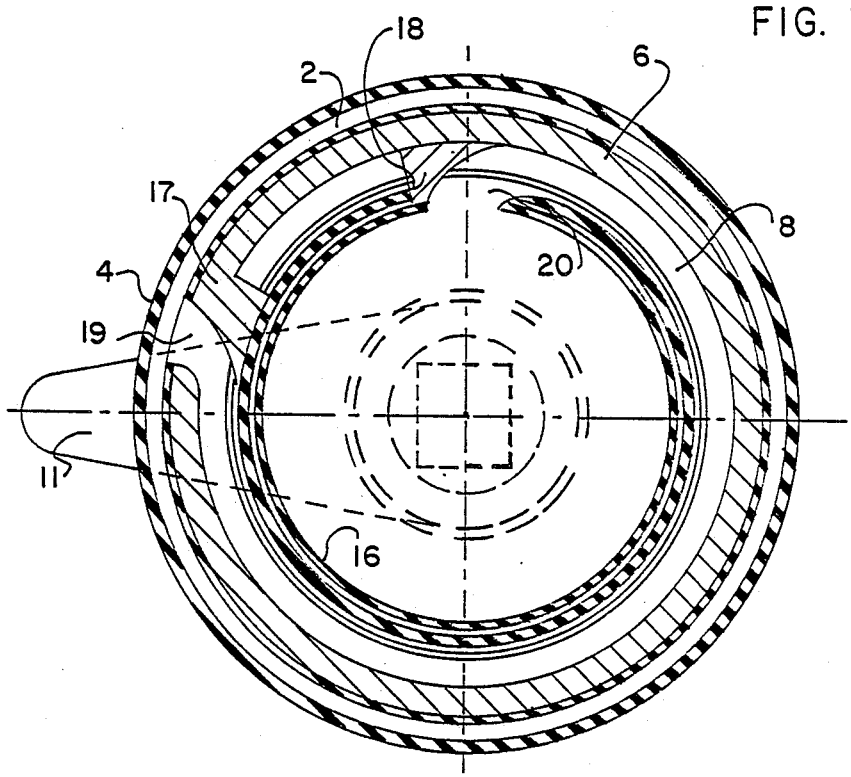
FIG. 3 is a horizontal section taken along the line 3—3 of FIG. 2.

In the example of embodiment according to FIGS. 2 and 3, a mount 50' includes the annular nozzle channel 8 which is located between the first component 6 for supporting the wall 3 of the rubber diaphragm 52' and the edge of an inner disk 15 that is adjustable around the central vertical axis 12 of the support bed, for example by rotation of the lever 11, that is connected to the spindle 10 as has already been described in FIG. 1. There is a lip seal 16 between the component 6 and the disk 15 that seals the gap between the two parts 6 and 15. The nozzle channel 8 extending annularly for almost 360° is limited at one end by a solid shaping or radial deflector 17 of the component 6 and at the other end by a similar shaping 18 of the disk 15 which is adjustable by turning. The shaping 17 defines a nozzle channel 19 at the opening to the compensating chamber 2, and the shaping 18 defines an opening 20 of the nozzle channel 8 at its connection into the working chamber 1. The length of the nozzle channel 8 can thus be adjusted by rotating the disk 15 between almost 360° and 0°, with an appropriate cross section profile of the two parts 5 and 15 forming the nozzle channel 8 between themselves also making it possible to adjust the channel cross section by turning the disk. The nozzle channel 8 must have a minimum length such that the resistances of the vibrating masses (buckling spring 14 with an optional insert) are greater than the resistance that results from the size of the openings 19 and 20. A nozzle channel that is too small leads to undesirable action in the low-frequency range since the resistance of the openings 19 and 20 are the determining factors. The known drawbacks in the area of the hole can be avoided by suitable matching.

What is claimed is:

1. A dual-chamber support bed with hydraulic cushioning for engine mount vehicles, having a working chamber and a compensating chamber filled with liquid, and walls defining said chambers made of annular rubber diaphragms having a predetermined buckling characteristics adapted to an operating load, and being connected to a housing, first and second rigid components of said housing overlapping one another and forming a nozzle chamber, said first and second rigid components of said housing being adjustable relative to one another, a rotatable spindle supported in said second component, said channel having a flow resistance which is adjustable by means of a regulating unit connected to said spindle, said first and second components being adjustable relative to one another in the direction of the vertical axis of the mount, and one of said components being threaded on said spindle which is rotatable freely in said housing, and said unit including an operating member extending out of said housing, said nozzle channel being positioned concentrically to the vertical axis in a plane perpendicular to it, said one component having a raised profile engaged in a corresponding die profile of said other component and being adjustable in this profile, said nozzle channel having a raised die profile which is connected by openings to the working chamber and to the compensating chamber and is sealed by means of an elastic diaphragm, and the raised profile of the component is adjustable relative to said diaphragm.

2. A dual-chamber support bed with hydraulic cushioning for engine mountings in vehicles, having a working chamber and a compensating chamber filled with liquid, and walls defining said chambers made of annular rubber diaphragms having a predetermined buckling characteristic adapted to an operating mode, and being connected to a housing having first and second rigid components having portions overlapping one another and defining between them a nozzle channel interconnecting said chambers, sealing means sealing the portions against one another, said first and second rigid components of said housing being adjustable in axial positions relative to one another to vary the cross-sectional area and thereby the flow resistance of the channel, an actuating spindle supported for free rotation in the housing by a regulating unit and in threaded engagement with one of said first and second components for effecting said adjustment of its position relative to the other component in the direction of the axis by rotation of the spindle thereby to vary the cross-sectional area and the flow resistance of the channel, and said unit including an operating member connected to the spindle and extending out of said housing for effecting continuous rotation of the spindle thereby to adjust the flow resistance of the channel during the operation of the vehicle.

3. Dual-chamber support bed pursuant to claim 2, said nozzle channel being positioned concentrically of, and in a plane perpendicular to, the mounting axis, said one component having a raised profile engaging in a corresponding die profile of said other component and being axially adjustable in the die profile, the sealing means being an elastic diaphragm stretching over and sealing off the die profile, the raised profile shaping the diaphragm into the die profile when the components are actually adjusted.

4. Dual-chamber support bed pursuant to claim 3 wherein the operating member is a lever movable in a slot in the housing and extending out of the housing laterally, ratchet means being provided to connect the spindle to the lever.

5. Dual-chamber support bed pursuant to claim 3 wherein said second component is adjustable coaxially with the axis by means of said spindle (10) and has a cup-shaped design in vertical cross section and has an edge pointing upward that forms the raised profile.

* * * * *